United States Patent
Meitinger et al.

(10) Patent No.: US 8,474,837 B2
(45) Date of Patent: Jul. 2, 2013

(54) APPARATUS FOR ADJUSTING CAMBER AND/OR TOE OF MOTOR VEHICLE WHEELS

(75) Inventors: Karl-Heinz Meitinger, München (DE); Wilfried Michel, Riedenburg (DE); Christoph Kossira, Ingolstadt (DE); Hugo Müller, Rohrenfels-Ballersdorf (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/516,449

(22) PCT Filed: Dec. 9, 2010

(86) PCT No.: PCT/EP2010/007477
§ 371 (c)(1),
(2), (4) Date: Aug. 20, 2012

(87) PCT Pub. No.: WO2011/082756
PCT Pub. Date: Jul. 14, 2011

(65) Prior Publication Data
US 2012/0306173 A1 Dec. 6, 2012

(30) Foreign Application Priority Data
Dec. 16, 2009 (DE) .......................... 10 2009 058 489

(51) Int. Cl.
*B62D 17/00* (2006.01)
(52) U.S. Cl.
USPC ................ 280/86.754; 280/5.521; 280/5.522; 280/86.753; 280/86.758

(58) Field of Classification Search
USPC ........ 280/5.521, 5.522, 5.52, 86.751, 86.753, 280/86.754, 86.755, 86.758, FOR. 112
IPC .................................... B62D 17/00; B60G 3/26
See application file for complete search history.

(56) References Cited

U.S. PATENT DOCUMENTS

2010/0072714 A1* 3/2010 Schmid et al. ............. 280/5.521
2010/0078910 A1* 4/2010 Mueller et al. ........... 280/93.503

FOREIGN PATENT DOCUMENTS

| DE | 10 2008 011 367 A1 | 10/1997 |
|---|---|---|
| DE | 10 2004 049 296 A1 | 4/2006 |
| DE | 10 2007 054 823 A1 | 12/2006 |
| DE | 10 2008 048 569 A1 | 3/2010 |
| JP | 2001-270464 A | 12/2005 |
| WO | WO 98/16418 A1 | 4/1998 |
| WO | WO 2005/047030 A1 | 5/2005 |

* cited by examiner

*Primary Examiner* — Paul N Dickson
*Assistant Examiner* — Keith Frisby
(74) *Attorney, Agent, or Firm* — Henry M. Feiereisen LLC

(57) ABSTRACT

An apparatus for adjusting the camber and/or toe of a motor vehicle wheel includes a wheel carrier, on which the wheel is rotatably mounted. The wheel carrier is divided into a carrier member receiving the wheel via a wheel bearing, an axle-side guide member, and a bearing assembly arranged therebetween. The bearing assembly includes rotary parts which can be rotated relative to each other and relative to both the carrier member and the guide member and which interact with confronting inclined faces. The wheel bearing includes a radially outer bearing housing, which is clamped by the bearing assembly formed from the rotary parts into a plug-and-socket connection with the carrier member.

17 Claims, 3 Drawing Sheets

APPARATUS FOR ADJUSTING CAMBER AND/OR TOE OF MOTOR VEHICLE WHEELS

CROSS-REFERENCES TO RELATED APPLICATIONS

This application is the U.S. National Stage of International Application No. PCT/EP2010/007477, filed Dec. 9, 2010, which designated the United States and has been published as International Publication No. WO 2011/082756 and which claims the priority of German Patent Application, Serial No. 10 2009 058 489.7, filed Dec. 16, 2009, pursuant to 35 U.S.C. 119(a)-(d).

BACKGROUND OF THE INVENTION

The invention relates to a device for adjusting camber and/or toe of the wheels of wheel suspensions, in particular for motor vehicles.

DE 10 2008 011 367 A1 describes a generic device, wherein the camber and/or toe of the wheels is adjustable while driving by way rotary parts integrated in the wheel carrier. The wheel carrier is hereby divided into a carrier member receiving the wheel and a guide member articulated on wheel suspension elements, which pivot the carrier member relative to the guide member by rotating one or both rotary parts with electric motors and with adjusting drives formed by spur gears. The adjustment is hereby attained in that the rotationally symmetrical rotary parts have a common rotation axis and surfaces or rotary bearings inclined relative to the rotation axis, which when the rotary parts are rotated in the same direction or in opposite directions enable a corresponding pivoting motion of the carrier member by camber and/or toe angles of up to 5°.

It is an object of the invention to improve the device of the generic type in order to achieve a robust and easily producible construction of the pivot bearings of the rotary parts including the wheel bearings arranged in the wheel carrier, which also simplifies the assembly of the respective components.

SUMMARY OF THE INVENTION

According to one aspect of the invention an apparatus for adjusting camber and/or toe of a vehicle wheel includes a wheel carrier supporting the wheel for rotation, wherein the wheel carrier comprises a carrier member having a wheel bearing receiving the wheel. The wheel bearing in which the vehicle wheel is rotatably mounted, has a radially outer bearing housing. The bearing housing is pressed by the bearing assembly formed by the rotary parts into a plug connection with the carrier member. In this way, the wheel bearing can be affixed on the carrier member in a technically simple manner, without requiring additional screw connections for securing the wheel bearing.

Preferably, the rotary parts are rotatably mounted on the carrier member and the guide member by way of tapered roller bearings. The bearing housing of the wheel bearing together with the tapered roller bearings may form a bearing assembly that can be assembled and preloaded from o common side. As mentioned above, the aforedescribed actions result in an easy-to-assemble integration of the rotary bearings of the rotary parts with the wheel bearing housing, eliminating screw connections between the bearing housing and the carrier member. The plug connection can have, for example, a telescopic construction, with an axial stop toward the carrier member.

It is furthermore proposed that the tapered roller bearings of the rotary parts with a common rotational axis are inclined with respect to each other in an X-shaped bearing arrangement. One inner bearing race of the bearing arrangement is hereby disposed on the bearing housing of the wheel bearing, whereas the other inner bearing race of the bearing arrangement is disposed on an adjusting ring inserted into the guide member. The adjusting ring can be directly or indirectly axially adjustable via a threaded connection in the guide member. This provides an easily adjustable arrangement of the tapered roller bearings in the created bearing assembly without play, with a simultaneous axial preload of wheel bearing housing.

The bearing housing of the wheel bearing and/or the adjusting ring adjustment may be efficiently manufactured from bearing steel and may directly incorporate the inner bearing races of the tapered roller bearings. Furthermore, the outer bearing races of the wheel bearing may also be directly incorporated in the wheel bearing housing.

In addition, the adjusting ring may preferably be displaceably guided in a hub section of the guide member and may be closed in the axial direction with a threaded ring. This configuration reliably supports and decouples the radial forces and moments on the tapered roller bearings and the axial preload forces.

In a particularly advantageous embodiment of the invention, the plug connection of the bearing housing with the carrier member may be composed of an inner cone of the carrier member which widens towards the tapered roller bearings and a corresponding outer cone on the bearing housing. Assembly is simplified because The bearing housing is not only received in the carrier member without any play, but assembly is also simplified because the bearing housing is automatically centered in the carrier member. In particular, the inner cone may be formed with a large support base in a hub section of the carrier member.

Furthermore, the rotation axis which is inclined with respect to the common rotation axis of the rotary parts may be defined by an additional tapered roller bearing disposed between the two rotary parts, with the inner bearing race and/or the outer bearing race of the additional tapered roller bearing implemented directly on the rotary parts.

According to a modified embodiment of the invention, when the wheel of the wheel suspension having one driven axle is driven via a central cardan shaft, then the joint housing of the cardan shaft may be fixedly connected via a plug connection and a central screw with a hub section of a wheel-bearing wheel flange, with the hub section further including two split inner rings of the wheel bearing and a clamping sleeve.

Lastly, a low-weight structure may be produced by making the components receiving the bearing members from steel and the other, less stressed components, such as in particular the guide member and the carrier member of the wheel carrier, from a light metal.

BRIEF DESCRIPTION OF THE DRAWING

An exemplary embodiment of the invention will now be described in more detail. The schematic drawing shows in.

DETAILED DESCRIPTION OF PREFERRED EMBODIMENTS

Figure 1:
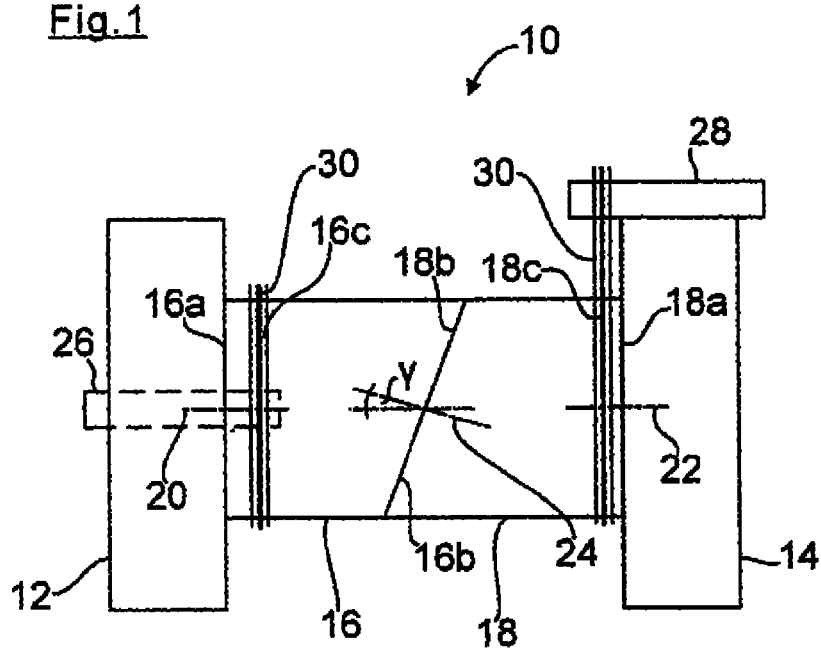
FIG. 1 a schematic diagram of the apparatus for adjusting toe and camber angle of a wheel suspension for motor vehicles with a multi-part wheel carrier.

For an explanation of the principle of the invention, FIG. 1 shows in form of a schematic block diagram a wheel guide element or wheel carrier 10 of a wheel suspension for motor vehicles, which is subdivided in the region of the wheel bearings for adjustment of the camber and/or toe of the wheel as follows:

The wheel carrier 10 includes a carrier member 12, in which the wheel and the brake member (brake disk or brake drum) of a service brake of the motor vehicle is rotatably supported. It should be noted that, unless otherwise mentioned, the functional parts of the suspension are of conventional design.

Furthermore, the wheel carrier 10 includes a guide member 14 which cooperates with the wheel suspension or optionally forms a part of the wheel suspension.

Two substantially rotationally symmetrical rotary parts 16, 18, which are each rotatably connected via respective rotation axes 20, 22 with the carrier member 12 and the guide member 14, are arranged between the carrier member 12 and the guide member 14 as actuating elements. The two rotation axes 20, 22 in FIGS. 1 and 2 are coaxially aligned and extend preferably in the wheel rotation axis.

Figure 2:
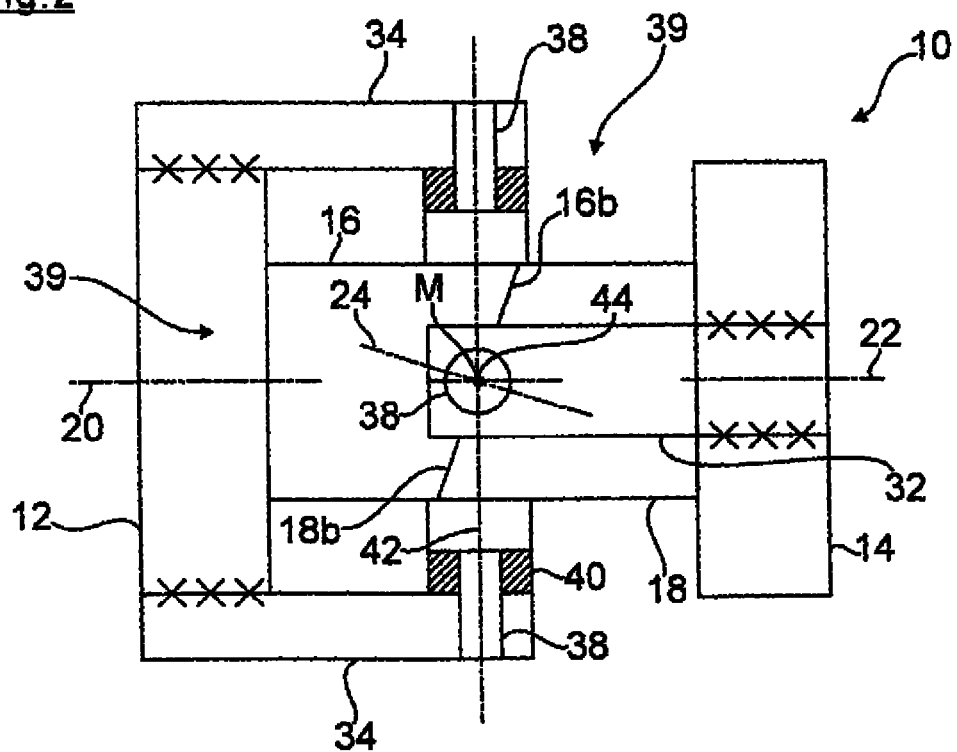
FIG. 2 the device of FIG. 1, showing the cardanic connection between the guide member and the carrier member of the wheel carrier.
Figure 3:
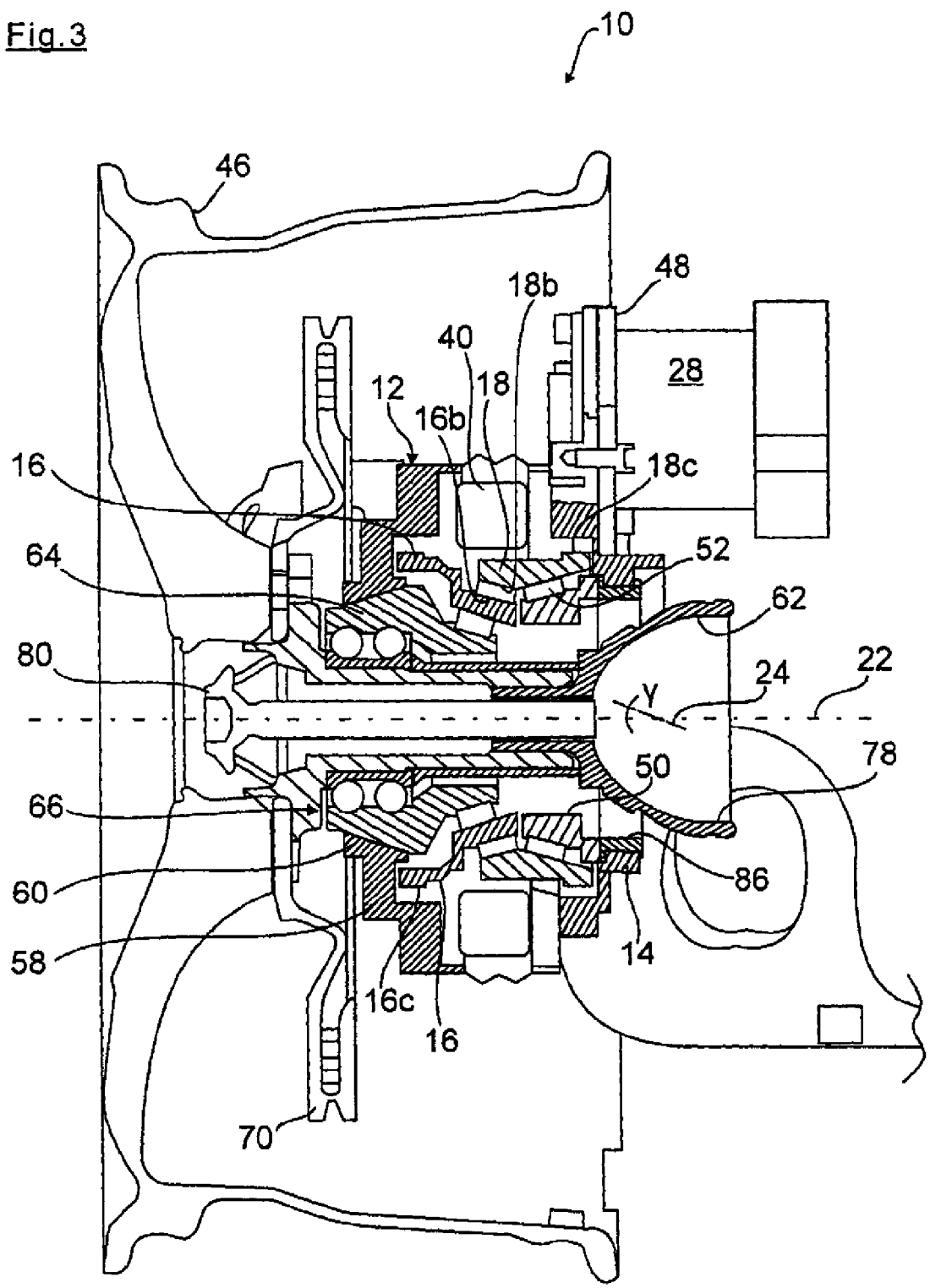
FIG. 3 a structural embodiment of the apparatus of FIGS. 1 and 2, with a carrier member carrying a wheel, with a guide member articulated on wheel guiding elements of the wheel suspension, and with two rotary parts which can be rotated via two tapered roller bearings and which are combined with the coaxial wheel bearing into a bearing assembly.
Figure 4:
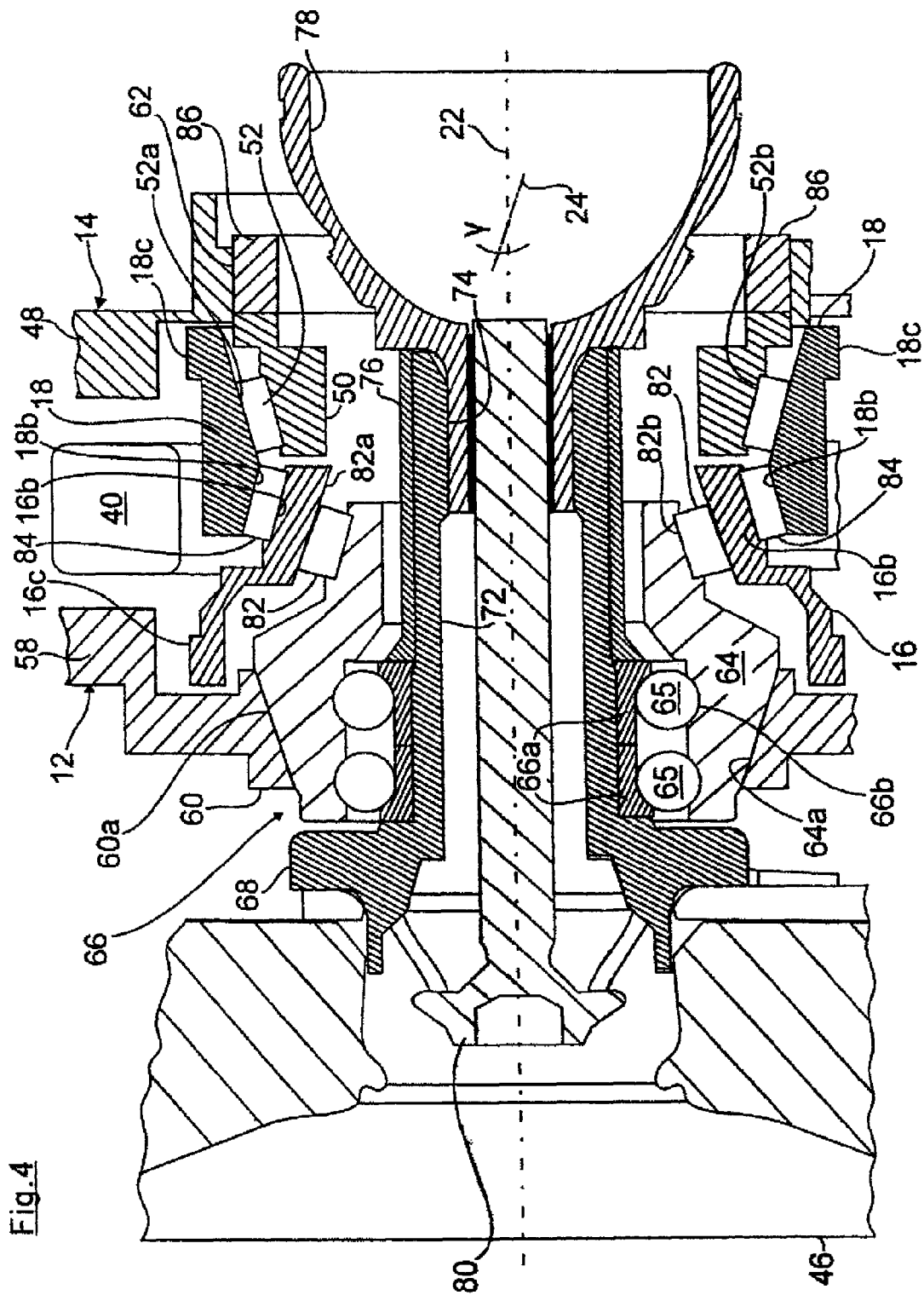
FIG. 4 an enlarged partial view of the apparatus of FIG. 3, showing only the bearing assembly.

Whereas the contact surfaces 16a, 18a of the rotary parts 16, 18 directly adjacent to the cannier member 12 and the guide member 14 are constructed with rotational symmetry, the rotary parts 16, 18 abut each other by way of planar or alternatively according to FIGS. 3 and 4 by way of conically inclined surfaces 16b, 18b and are rotatably connected to each other via a rotation axis 24. According to FIGS. 1 and 2, the rotation axis 24 is hereby perpendicular to the inclined surfaces 16b, 18b and inclined at a defined angle γ with respect to the rotation axis 20 of the rotary part 18.

A respective electric servomotor 26, 28 is arranged on the carrier member 12 and on the guide member 14, with the respective servomotors being drivingly connected to the corresponding rotary parts 16, 18 via schematically indicated drive gears 30. The rotary parts 16, 18 can be rotated with the servomotors 26, 28 in both rotation directions, either in the same direction or in opposite directions, causing the carrier member 12 to perform a pivoting or tumbling motion relative to the guide member 14 and thereby changes the toe angle and/or the camber angle of the wheel.

FIG. 2 shows schematically a cardanic coupling between the guide member 14 and the carrier member 12 which operates as an axial lock (holding the guide member and the carrier member together), as a rotation-lock, and as a torque support, for example, for braking torques and drive torques acting on the carrier member 12.

For this purpose, articulated forks 32, 34, which are offset with respect to each other by 90° and which are connected with each via bearing pins, commonly designated with 38, and a supporting ring 40, are attached to the guide member 14 and the carrier member 12. The carrier member 12 can thus be cardanically pivoted about a vertical axis 42 and about an axis 44 perpendicular to the drawing plane, wherein the instantaneous center M of the cardanic connection is located at the intersection between the rotation axis 22 and the inclined rotation axis 24 of the rotary parts 16, 18.

As already mentioned, the two rotary parts 16, 18 in FIGS. 1 and 2 contact each other via planar inclined surfaces 16b, 18b to realize the inclined rotation axis 24. Conversely, in the following FIGS. 3 and 4, the inclined rotation axis 24 of the rotary member 16 is not realized with the contacting planar inclined surfaces 16b, 18b, but instead with conical inclined surfaces 16b, 18b, which face each other with an interposed tapered roller bearing 84.

FIGS. 3 and 4 show the structure of the wheel carrier 10 in a partial longitudinal section taken along the rotation axis 22 of the wheel of the wheel suspension, wherein the description is limited to the essential features of the invention. Functionally identical parts are denoted by identical reference symbols.

As described above, the wheel carrier 10 is composed of the guide member 14 which is connected for articulation relative to wheel guiding elements of the wheel suspension, such as control arms, etc., the carrier member 12 supporting the wheel (rim 46) and the rotary parts 16, 18.

The guide member 14 has a support flange 48 which supports a radially inner bearing ring 50. The bearing ring 50 forms via bearing rollers 52 in conjunction with the radially outer rotary part 18 a first roller bearing, whose rotation axis coincides with the rotation axis 22. The outer bearing race 52a (FIG. 4) of the tapered roller bearing 52 is ground directly into the rotary part 18, which is for this purpose made of bearing steel and processed accordingly (hardened, etc.).

The rotary part 18 is further provided at its outer periphery with a spur gear 18c which drivingly cooperates via an unillustrated intermediate gear wheel with an unillustrated drive gear of the electric motor 28, thus forming the toothed drive gear 30 depicted in FIG. 3. The electric motor 28 is hereby attached on the support plate 48 of the guide member 14, on which the intermediate gear wheel is also supported for rotation. The rotary part 18 can be adjusted in both rotation directions with the electric motor 28.

The carrier member 12 has a radially oriented flange section 58 and an axially extending hub section 60. The hub section 60 is provided with an inner cone 60a (FIG. 4) which widens toward the tapered roller bearing 52.

In a simple plug connection, the outer cone 64a of a rotationally symmetrical bearing housing 64 of a tapered bead wheel bearing 66 having two ball rows 65 protrudes into the inner cone 60a of the hub portion 60 of the carrier member 12. The wheel bearing 66 serves as a rotary bearing for a wheel flange 68, on which in turn the wheel or the rim 46 and a brake disk 70 are attached with wheel bolts (not numbered).

Furthermore, the wheel flange 68 has a hub section 72 which extends approximately to the height of the tapered roller bearing 52 and receives the two inner bearing rings 66a of the wheel bearing 66 and which is fixedly connected via a spline 74 and a clamping sleeve 76 to the joint housing 78 of a cardan shaft (not shown in detail) driving the wheel. A central screw 80 supported on the wheel flange 68 and screwed into the joint housing 78 holds the entire assembly together in an axial direction.

The outer bearing races 66b of the wheel bearing 66 are ground directly into the bearing housing 64 made from bearing steel which protrudes into the inner cone 60a of the carrier member 12.

Furthermore, the bearing housing 64 has an additional outer cone which is constructed with the opposite cone angle and directly forms the inner bearing race 82b for tapered rollers of a tapered roller bearing 82 for the second rotary part 16. The rotary part 16 is also made from roller bearing steel and directly supports the outer bearing race 82a of the tapered roller bearing 82. In addition, the rotary part 16 has radially outward the aforementioned inclined conical surface 16b. This conical surface 16b cooperates via a tapered roller bearing 84 with the inclined conical surface 18b of the rotary part 18 to realize the inclined rotation axis 24 of the rotary part 16. Respective inner and outer bearing races of the tapered roller bearing 84 are ground into the two conical inclined surfaces 16b, 18b.

The tapered roller bearing 52 disposed between the adjusting ring 50 and the rotary part 18 and the tapered roller bearing 82 disposed between the bearing housing 64 and the rotary part 16 are arranged in an X-shaped bearing configuration (the cones of the inner bearing races 52b, 82b are arranged with a confronting taper), wherein the tapered roller bearing 82 is arranged rotationally symmetrically about the inclined rotation axis 24. Conversely, the tapered roller bearing 52 is arranged rotationally symmetrically about the rotational axis 22. A rotation of the rotary part 16 with the electric motor 26 and/or a rotation of the rotary part 18 with the electric motor 28 then cause the carrier member 12 to pivot relative to the guide member 14

The entire bearing assembly with the bearing housing 64, the tapered roller bearings 52, 82 and 84 can be adjusted with a threaded ring 86 and preloaded. The threaded ring 86 is screwed into the support flange 48 of the guide member 14 via a threaded connection 62. The threaded ring 86 operates to preload the adjusting ring 50 of the first tapered roller bearing 52, which is displaceably guided in the support flange 48, to the left. Accordingly, the entire bearing assembly 52, 82, 84 together with the bearing housing 64 of the wheel bearing 66 is preloaded from the right side of the drawing to the left side against the inner cone 60a of the hub portion 60 of the carrier member 12. Due to the relatively large conical support base, an additional screw connection between the carrier member 12 and the bearing housing 64 of the wheel bearing 66 may be eliminated.

As already explained with reference to FIG. 2, a cardanic connection between the guide member 14 and the carrier member 12, which is disposed radially outward of the rotary part 16, 18, is also provided in the embodiment of FIGS. 3 and 4. The aforementioned bearing preload is axially supported by the cardanic connection, while the pivoting mobility of the carrier member 16 in relation to the guide member 14 is maintained when the rotary parts 16, 18 rotate. For sake of clarity, only the support ring 40 is shown in the cross-sectional drawing of FIGS. 3 and 4, while the articulated forks 32, 34 are not depicted.

To provide a low-weight construction of the described wheel carrier 10, the components receiving the tapered roller bearings 52, 82, 84 and the wheel bearing 66, as well as the bearing housing 64, the rotary parts 16, 18, the adjusting ring 50, etc., are made from steel, whereas the less stressed guide member 14 and the carrier member 12 are made from a light metal.

What is claimed is:

1. An apparatus for adjusting camber and/or toe of a vehicle wheel, comprising:
 a wheel carrier supporting the wheel for rotation, wherein the wheel carrier is divided into
 a carrier member receiving the wheel by way of a wheel bearing having a radially outer bearing housing,
 an axle-side guide member, and
 a bearing assembly interposed between the carrier member and the axle-side guide member, said bearing assembly comprising rotary parts which cooperate with mutually facing inclined surfaces and which can rotate relative to one another and relative to both the carrier member and the guide member,
 wherein the radially outer bearing housing is tensioned against the carrier member by way of the bearing assembly in the form of a plug connection.

2. The apparatus of claim 1, wherein the bearing housing comprises a first conical surface providing a conical seat between the bearing housing and the carrier member for forming the plug connection.

3. The apparatus of claim 2, wherein the plug connection is composed of an inner cone disposed on the carrier member which widens toward the at least one tapered roller bearing and a corresponding outer cone disposed on the bearing housing.

4. The apparatus of claim 3, wherein the inner cone is formed with a large support base in a hub section of the carrier member.

5. The apparatus of claim 1, wherein the bearing assembly comprises at least one tapered roller bearing and the bearing housing comprises a second conical surface cooperating with the at least one tapered roller bearing.

6. The apparatus of claim 5, wherein the rotary parts are supported for rotation relative to one another and on the guide part by the at least one tapered roller bearing.

7. The apparatus of claim 6, wherein each rotary part has a corresponding tapered roller bearing, with the tapered roller bearings having a common rotation axis and being inclined with respect to each other in an X-shaped bearing arrangement.

8. The apparatus of claim 7, wherein a first inner bearing race of the X-shaped bearing arrangement is arranged on the bearing housing and a second inner bearing race of the X-shaped bearing arrangement is arranged on an adjusting ring inserted in the guide member, wherein the adjusting ring is either indirectly or directly axially adjustable in the guide member via a threaded connection.

9. The apparatus of claim 8, wherein at least one of the bearing housing and the adjusting ring is made from bearing steel and directly comprises the inner bearing races of the tapered roller bearings.

10. The apparatus of claim 9, wherein the bearing housing comprises outer bearing races incorporated directly into the bearing housing.

11. The apparatus of claim 8, wherein the guide member comprises a hub section and the adjusting ring is displaceably guided in the hub section and is axially closeable by a threaded ring.

12. The apparatus of claim 1, wherein the bearing housing together with the rotary parts can be assembled and adjusted from a common side.

13. The apparatus of claim 1, wherein the wheel carrier comprises an articulated restraining member disposed between the carrier member and the guide member, wherein the carrier member and the guide member can be tensioned by the restraining member through interposition of the rotary parts and the bearing housing.

14. The apparatus of claim 13, wherein the restraining member comprises a cardan joint.

15. The apparatus of claim 1, wherein a tapered roller bearing disposed between the two rotary parts defines a rotation axis, which is inclined with respect to a rotation axis of a rotary part, with inner and outer bearing races of the tapered roller bearing being implemented directly on the rotary parts.

16. The apparatus of claim 1, wherein the wheel is driven via a central drive shaft having a joint housing that is fixedly connected via another plug connection and a central screw with a hub section of a wheel flange carrying the wheel, wherein the hub section supports two inner rings of the wheel bearing and a clamping sleeve.

17. The apparatus of claim 1, wherein components accommodating the at least one tapered roller bearing and the wheel bearing are made from steel, and the guide member and the carrier member are made from a light metal.

\* \* \* \* \*